Oct. 18, 1966

C. C. BROWN 3,279,542

ANCHORING MEANS ASSEMBLY

Filed Feb. 17, 1964

CICERO C. BROWN
INVENTOR.

BY

ATTORNEYS

Oct. 18, 1966

C. C. BROWN 3,279,542

ANCHORING MEANS ASSEMBLY

Filed Feb. 17, 1964

CICERO C. BROWN
INVENTOR.

BY Vincent Martin
Jos. E. Edwards
M. H. Gay
ATTORNEYS

United States Patent Office 3,279,542
Patented Oct. 18, 1966

3,279,542
ANCHORING MEANS ASSEMBLY
Cicero C. Brown, 8490 Katy Road, Houston, Tex.
Filed Feb. 17, 1964, Ser. No. 345,235
9 Claims. (Cl. 166—139)

This invention relates to new and useful improvements in an anchoring means assembly for use in a well bore and relates particularly to an anchoring means assembly which will effectively hold its position in the bore against longitudinal or axial forces from either driection and which is readily releasable when desired.

The invention is applicable for use in anchoring well devices, such as well packers and the like, or well tubing within the bore.

The usual two direction or dual-lock anchoring means assembly includes a gripping element which co-acts with an upper and a lower expander member or cone, whereby when the expander cones are moved into position behind the gripping element, the gripping element is urged radially outwardly into gripping engagement with the pipe wall. Said expander cones function to wedge and hold the gripping element into tight engagement with the pipe and release of the gripping element can be effectively accomplished only by moving both cones from behind the slips. The required opposite motion of the expander cones to assure release has led to the disadvantage of complicating the structure of the actuating means for the cones and also to the difficulty of obtaining consistent efficient operation.

It is, therefore, one object of this invention to provide a two direction or dual-lock anchoring means assembly wherein a gripping element is maintained in gripping position by upper and lower expander members and which, although simple in construction, is arranged so that a positive force may be applied to each expander member to move each expander from behind the gripping element and thereby assure full release of the anchoring means assembly.

An important object is to provide a two direction or dual-lock anchoring means assembly in which the positive releasing force applied to the expander cone members is controlled by the manipulation of the pipe or tubing string upon which said assembly is mounted.

Another object is to provide an anchoring means assembly of the character described, having upper and lower expander cones co-acting with radially movable gripping elements to move or release said gripping elements to and from gripping position; said expander cones being carried by a support which upon rotation followed by downward movement thereof relative to said expander cones, moves the same in a direction to set the gripping elements into gripping position. The support also including means controlled by rotation and upward movement of the support relative to the expander cones for releasing the wedging action of the upper cone, and also controlled by subsequent downward movement of the support relative to both the upper and lower cones for applying a direct releasing force to the lower cone, whereby both cones are moved from behind the gripping elements to release the entire assembly.

A further object is to provide an anchoring means of the type stated wherein no left-hand rotation of the tubing string which might back off one of its connections is required to either set or release the anchoring means.

A particular object is to provide an anchoring means assembly, of the character described, which is particularly applicable for use with well packers, particularly with a well packer having an annular sealing or packing element deformable by an endwise application of force, or other well devices or simply as an anchoring means for well tubing; the assembly being constructed so that the setting and releasing thereof are accomplished mechanically by properly manipulating the pipe string in which it is connected.

The construction designed to carry out the invention will be hereinafter described, together with other features thereof.

The invention will be more readily understood from a reading of the following specification and by reference to the accompanying drawings forming a part thereof, wherein an example of the invention is shown, and wherein.

Figure 1:
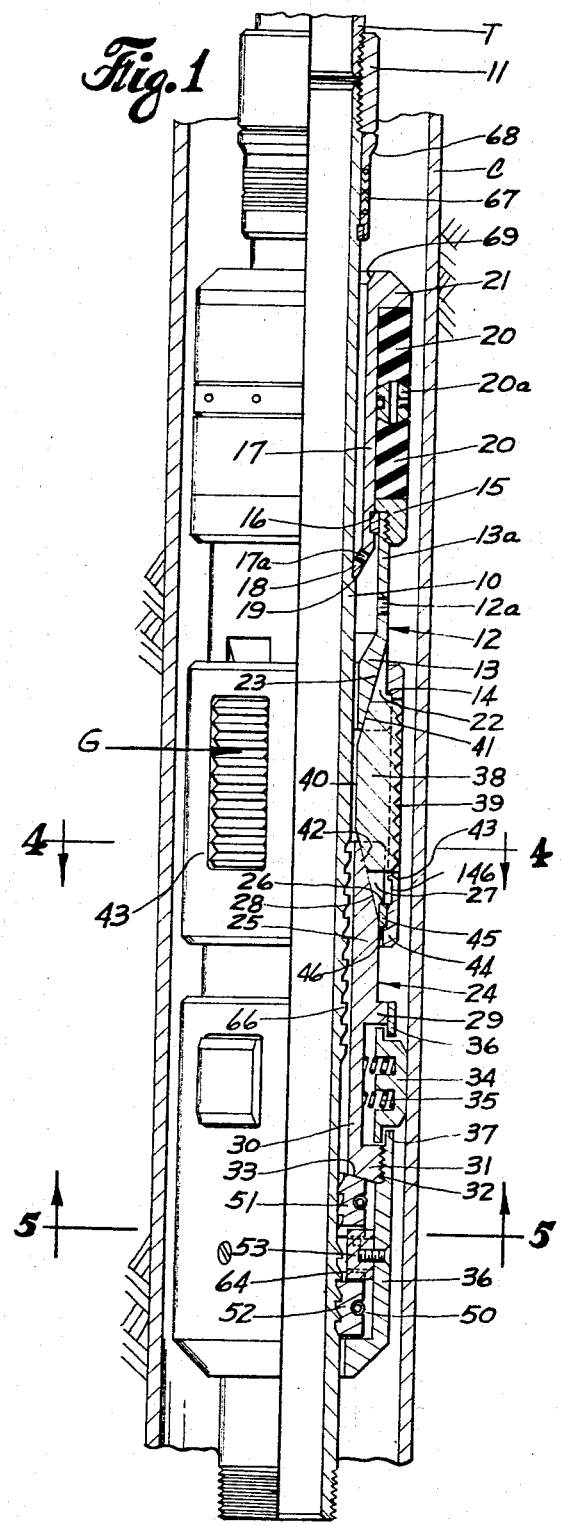
FIGURE 1 is a view partly in section and partly in elevation and illustrating the improved anchoring means assembly, constructed in accordance with the invention, combined with a well packer, the various parts of the assembly being shown in the position while the apparatus is lowered within the well bore.

In the drawings the improved anchoring means assembly comprising the invention is illustrated as combined with a well packer apparatus and includes a central tubular mandrel or support 10. The support may be connected by the usual couplings 11 in a pipe or well tubing string T whereby it may be lowered and raised within the well bore by means of said pipe string.

Figure 3:
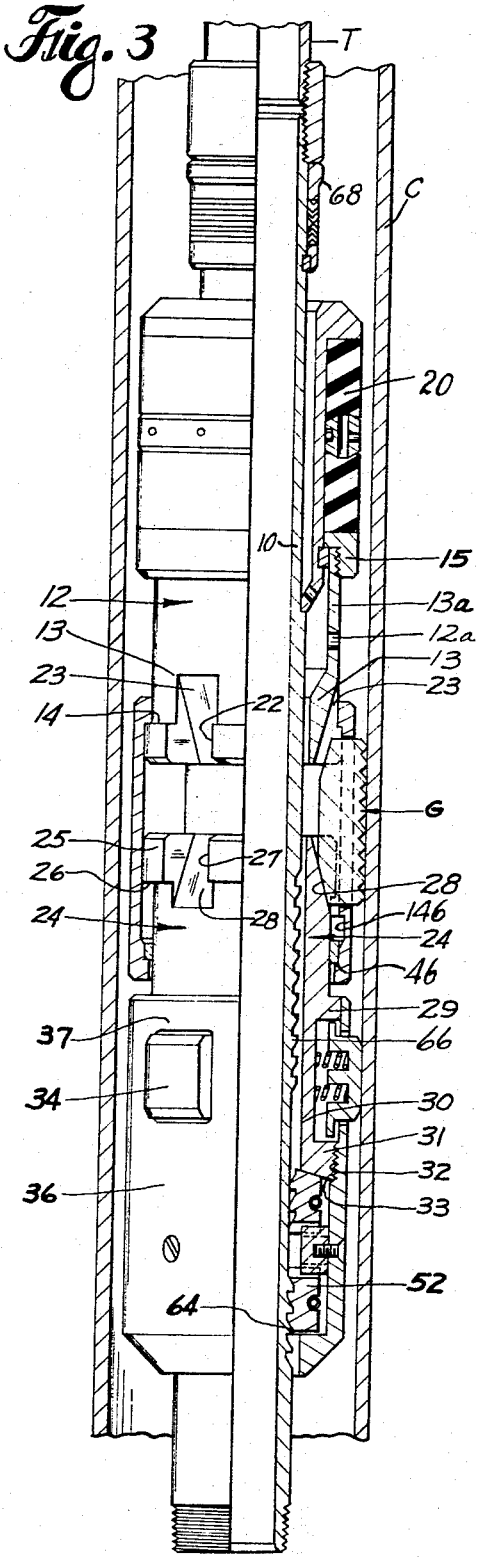
FIGURE 3 is a view similar to views 1 and 2, showing the upper expander cone of the assembly in released position and with the remaining parts in a position to apply a downward force to the lower expander member to effect full release of the apparatus.

An upper expander member 12 encircles the mandrel or support 10 and comprises a body portion 13 which is formed with an upwardly facing, external shoulder 14 nearer its lower end (FIGURE 3). The upper end of the body portion 13 is reduced to provide an upwardly directed extension 13a which has connection with a support ring 15, the ring 15 is, in turn, supported upon a shoulder 16 which may be formed by a snap ring carried by the external surface of a sleeve 17. The lower end of the sleeve is inclined inwardly as shown at 18 and is adapted to engage a support shoulder 19 provided on the exterior of the mandrel 10.

When the invention is combined with a well packer apparatus, annular sealing or packing elements 20 surround the sleeve 17 and the upper end of said sleeve has an outwardly directed flange or abutment 21 overlying the uppermost sealing element, whereby said sealing elements are confined between said abutment and the support collar 15. A suitable separator 20a may be interposed between the two sealing elements 20.

The external lower portion of the upper expander member 12 has a plurality of grooves 22 (FIGURES 3) cut therein at circumferentially spaced points and the base 23 of each groove forms an inclined expander surface. A groove and expander surface is provided for each gripping element G of the assembly, as will be explained.

A lower expander member 24 comprises a body portion 25 which is formed with a downwardly facing, external annular shoulder 26 nearer its upper end (FIGURE 3). A plurality of grooves 27 for the reception of the gripping elements G are cut in the upper portion of the body 25 and the base of each groove is inclined as indicated at 28. Spaced downwardly from the shoulder 26 is an external annular flange 29 and below the flange the body portion is reduced in thickness to form a downwardly extending sleeve extension 30. At the lower end of the sleeve extension is a second outwardly directed flange portion 31 formed with connecting threads 32 on its external surface. The lower end or bottom of the flange 31 is inclined downwardly and outwardly as shown at 33 for a purpose which will be hereinafter explained.

A friction block unit includes a plurality of friction blocks 34 which are urged outwardly by coiled springs 35 and which are disposed between the flanges 29 and 31 of the lower expander element body; said blocks extend through windows 37 cut in the upper end of an annular housing 36. The central portion of the housing 36 is connected by threads to the threaded area 32 of the lower flange 31 of said lower expander and the lower portion of said housing extends downwardly below said flange. The friction blocks 34 frictionally engage the wall of the well pipe or casing C into which the apparatus is lowered and being connected with the lower expander member, function to maintain said member stationary in the pipe during the setting operation.

Figure 4:
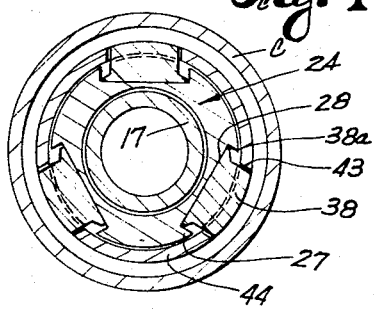
FIGURE 4 is a horizontal cross-sectional view taken on the line 4—4 of FIGURE 1.
Figure 5:
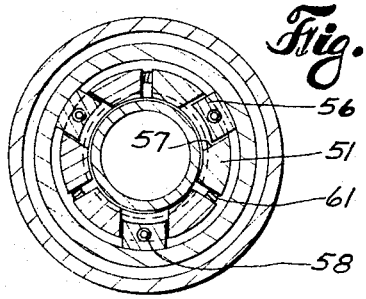
FIGURE 5 is a horizontal cross-sectional view taken on the line 5—5 of FIGURE 1.

Mounted between the upper and lower expander members 12 and 24 are a plurality of gripping element 38. Each gripping element includes a body having its outer surface formed with gripping teeth 39. The inner surface of each gripping element is formed with a generally flat mid portion 40, an upper inclined surface 41, and lower inclined surface 42. The upper surface 41 of each gripping member is adapted to coact with the inclined expander surface 23 of the upper expander 12, while the lower surface 42 of said gripping member coacts with the inclined expander surface 28 of the lower expander. Each gripping element extends through a window 43 formed in a slip carrier housing or cage 44 which encircles the expanders 12 and 24. Complete outward displacement of each gripping element is prevented by longitudinal ribs 38a formed at the rear of each side of each gripping element (FIGURE 4), said ribs projecting inwardly of the vertical edges of each window 43.

The slip carrier is formed with an inwardly directed, downwardly facing shoulder at its upper end which engages the external shoulder 14 of the upper expander member 12. The engagement of the slip carrier with shoulder 14 limits the upward movement of the expander 12 with respect to the said slip carrier or cage. Connection of the slip carrier with the lower expander member 24 is accomplished by means of a snap ring 45 which rests upon a shoulder 46 formed in the bore of said slip carrier at its lower end; the upper end of the ring abuts or engages the downwardly facing shoulder 26 formed on the body of the lower expander member. With this arrangement, downward movement of the lower expander member 24 with respect to the slip carrier cage is limited.

The slip carrier or cage 44 and its gripping elements or slips 38 are assembled upon the two expanders by first encircling the upper expander 12 and moving the carrier downwardly over the same. As the lower portion of the carrier approaches the upper end of the lower expander, the snap ring 45 is placed in a groove 146 in the bore of the carrier; when so positioned, the lower end of the slip carrier 45 may be slid downwardly over the upper end of the lower expander 24 and upon the snap ring 45 moving below the shoulder 26, said ring moves inwardly below said shoulder; then upon a slight lifting of the slip carrier, the parts will assume the position shown in FIGURE 1. Thus the slip carrier is confined on the expanders by the shoulder 14 on the upper expander and the shoulder 26 on the lower expander.

Figure 2:
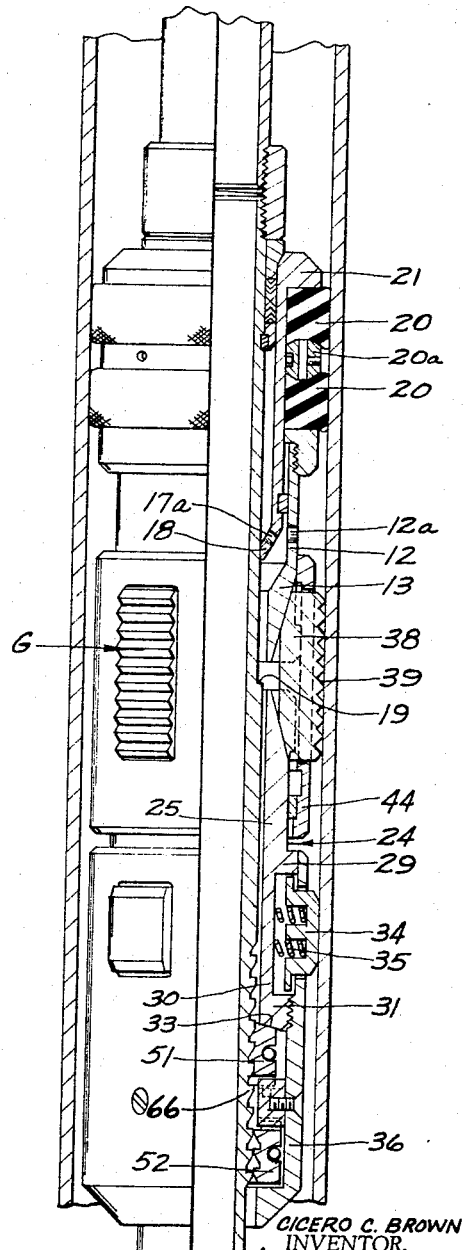
FIGURE 2 is a similar view illustrating the anchoring means assembly and the well packer sealing element in a set position.

The upper and lower expanders 12 and 24 are capable of movement toward each other and upon such movement, the inclined surfaces 23 of the upper expander and the inclined surfaces 28 of the lower expander coact with the inclined portions 41 and 42 of each gripping element 38 to move the gripping element radially outwardly into gripping engagement with the well casing or pipe C, as shown in FIGURE 2. Release of the gripping elements from their respective positions with the pipe is effected by withdrawing the upper expander upwardly from behind each gripping element and by withdrawing the lower expander downwardly from behind said gripping elements. When the withdrawal of the expander members is effected, the slips or gripping elements 38 may move radially inwardly to release their gripping engagement with the pipe.

Figure 6:
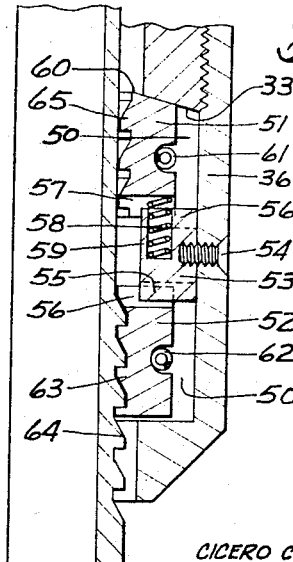
FIGURE 6 is an enlarged detailed sectional view of the latching and locking dogs which co-act with the main mandrel or support.

For effecting the setting of the anchoring means assembly, and also for applying the necessary forces to the expanders to withdraw the same from behind the gripping members, the tubular housing 36 in which the friction blocks 34 are mounted, extends downwardly below the flange 31 at the lower end of the lower expander. Mounted within suitable recesses 50 formed in the interior of the housing 36 is a locking unit consisting of a plurality of locking dogs 51 and a latching unit consisting of a plurality of latching dogs 52 (FIGURE 6). Disposed between the locking and latching dogs in each recess is a block 53 which is secured therein by screws 54. The bottom of each block 53 has radially directed ribs 55, each of which is slideable within a groove 56 in the upper surface of one of the latching dogs 52, whereby said dogs are prevented from rotating with respect to the housing 36. Similar ribs 56 are formed in the top of each block 53 and engage complementary grooves 57 in the under side of the upper locking dogs 51 to prevent rotation of said dogs relative to the housing. Urging each locking dog upwardly is a coil spring 58 confined within a recess 59 in the block 53 and this spring constantly urges the upper inclined surface 60 of each upper locking dog into contact with the inclined surface 33 formed at the lower end of the lower expander member 24. A garter spring 61 encircles the upper locking dogs 51 and urges them inwardly toward the tubular mandrel or support; similarly, a garter spring 62 encircles the lower latching dogs 52 and urges such dogs inwardly.

The latching dogs 52 are formed with right-hand threads 63 which are relatively coarse and which are shaped in a manner to permit complementary threads 64 formed on an external section of the mandrel to engage the same by threading in one direction and by ratcheting thereinto in an opposite direction. As viewed in FIGURE 6, the connecting threads 64 on the mandrel may be disengaged from the latching dogs 52 upon an upward pull of the mandrel because of the ratcheting effect. However, in order to release the threads 64 from the latching dogs 52 by downward movement of the mandrel or support 10, it is necessary that the mandrel be rotated in a direction to the right as viewed downwardly from the top of the pipe string. Upon such rotation, the threads 64 will move downwardly out of engagement with the latching dogs 52.

The locking dogs 51 are each provided with left-hand threads 65 which are disposed in an opposite relationship to the threads 63 of the latching dogs. Said threads 65 of the locking dogs are adapted to coact with another series of threads 66, also formed on a threaded section of the mandrel but spaced upwardly from the threads 64. The threads 66 are adapted to ratchet downwardly into engagement with the locking dogs 51 but disengagement thereof can only be accomplished by a right-hand rotation of the tubular mandrel or support with respect to said locking dogs. Since the threads 65 and 66 are left-hand threads, a right-hand rotation of the mandrel with respect to the locking dogs will result in an upward movement of said mandrel or support with respect to said locking dogs. As will be explained, the lower or latching dogs function to maintain the parts in an unset position during lowering and may also be utilized to release the lower expander. The upper or locking dogs may be utilized to lock the apparatus in its set position.

When the apparatus is in position to be lowered into the well, the parts are in the position shown in FIGURE 1 and at this time the expanders 12 and 24 are moved away from each other a sufficient distance to permit the gripping elements 38 to be in their retracted position. It is preferable that there be a free bypass through and around the tool during lowering and for this purpose the upper expander 12 is formed with suitable bypass openings 12a and the lower end of the support sleeve 17 is also provided with bypass openings 17a. Thus, during lowering or raising, fluid passes upwardly through the bore of the central support as well as around its exterior and also, fluid from the annulus surrounding the device flows upwardly through the bypass openings 12a and 17a and then through the annular space between the support 10 and sleeve 17 around the sealing elements and to the area above the apparatus. This bypass is often necessary when the packer is released, but the rubber seal fails to return to its relaxed position. Then the bypass keeps the deformed seal from swabbing the well.

At the upper end of the tubular support or mandrel, an annular packing 67 is provided and above said packing an outwardly projecting annular shoulder 68 is formed; said shoulder is adapted to engage an annular seating surface 69 formed at the upper end of the abutment or flange 21 of the sleeve 17. When the tubular support is moved downwardly with respect to the sleeve 17, the packing 67 closes the annular space between the support 10 and sleeve 17 to shut off the bypass flow of fluid around the sealing elements 20 of the well packer apparatus.

In operation, the parts are in the position shown in FIGURE 1 when the apparatus is being lowered into the well. In this position, the lower right-hand threads 64 on the tubular support or mandrel are engaged with the latching dogs 52. When so engaged, the shoulder 26 of the lower expander 24 is engaging the snap ring 45 of the slip carrier. The upper expander 12 is suspended from the support collar 15 and sleeve 17, which sleeve has its lower end engaging the external shoulder 19 on the support. In this position, the expanders are separated a sufficient distance that the gripping elements 38 are retracted. The friction blocks 34, which form part of the lower expander assembly, are frictionally engaged with and ride upon the wall of the pipe or casing C into which the apparatus is being lowered.

Upon reaching the desired position within the well pipe, the tubular support or mandrel 10 is rotated in a direction to the right as viewed from the surface and such rotation is with respect to the latching dogs 52. At this time, the latching dogs are held against rotation because they are connected through the block 53 with the lower housing 36 and thus to the friction blocks 34. Therefore, as the tubular support is rotated, the lower threads 64 on the mandrel move downwardly and disengage from the latching dogs 52. When this occurs, the tubing string and the tubular support 10 are moved downwardly with respect to the remainder of the assembly and such downward movement moves the seal into the upper sleeve 17 and causes the shoulder 68 to engage the seating surface 69 at the upper end of the flange 21, whereby the weight of the tubing string may be imposed upon the sealing means 20 and upon the upper expander 12.

As weight is imposed upon the upper expander, the expander is moved downwardly with respect to the gripping elements 38 and the lower expander, and the coaction of the expander surfaces 23 and 28 with the gripping elements urges said gripping elements radially outward toward pipe-gripping position with the casing C; at this time, the lower expander 24 is maintained stationary by the engagement of the friction blocks 34 with the inner wall of said casing. When the gripping members have moved into gripping position, the upper expander becomes stationary and the continued imposition of the tubing weight applies endwise force to and deforms the sealing or packing elements 20 into sealing position.

By the time the parts reach this position, as shown in FIGURE 2, the upper set of threads 66 on the mandrel or tubular support will have ratcheted into the locking dogs 51. In such position, the apparatus is in fully set position with the gripping members 38 engaging the wall of the well casing C and the sealing elements 20 in sealing position. Since the threads 66 on the support have engaged the threads of the locking dogs 51, the parts are locked in their set position. Any pressure from below tending to move the sealing elements 20 upwardly will be transmitted through the central support to the locking dogs 51 which, in turn, will transmit the force directly to the lower expander 24 to urge said expander upwardly and move the gripping members into tighter gripping position. Any pressure from above the sealing elements which would act downwardly will merely drive the upper expander 12 into tighter wedging engagement behind the gripping elements to increase the gripping thereof. Thus, the apparatus is locked in both directions against displacement from its set position within the well casing or pipe C.

When it is desired to release the gripping members, it is only necessary to rotate the tubular mandrel or support to the right as viewed downwardly from the surface of the well. Because the threads 66 on the mandrel and the threads 65 of the locking dogs 51 are left-hand threads, a rotation to the right will result in an upward movement of said mandrel or support with respect to the sealing assembly and expanders. The locking dogs 51 are maintained stationary by reason of their connection with the lower expander which is held firmly in position because of the gripping slips and also by the friction blocks 34. The disconnection of the threads 65 and 66 permits the tubular support to be moved upwardly to the position shown in FIGURE 3, in which position all endwise force applied to the sealing elements 20 has been relieved and the upper expander 12 has been positively lifted upwardly from behind the gripping elements or slips 38 by engagement of the shoulder 19 with sleeve 17 and expander 12. By the time the parts have reached this position, the lower threads 64 on the tubular support or mandrel have ratcheted into engagement with the latching dogs 52 but the lower expander is still in position behind the gripping members or slips 38 to maintain them in gripping position.

The support is thereafter moved downwardly a sufficient distance to apply a positive downward force through the latching dogs 52 to the housing 36 and then to the lower expander 24 which has direct connection with said housing. Such downward movement will forceably withdraw the lower expander from behind the gripping members or slips 38 and said slips may them move inwardly into a retracted position and out of engagement with the well pipe. It is pointed out that the downward movement required to withdraw the lower expander from behind the gripping members is not sufficient to re-engage the upper expander 12 with the upper inclined surface of each gripping member. Since both expanders are free from wedging engagement with the slips, and as the lower expander is held against movement by the friction blocks, an upward movement of the mandrel will pick up on the upper expander and cage, with threads 64 ratcheting through dogs 52, until the expanders are the maximum distance apart; thus, the parts are returned to the position shown in FIGURE 1. Thereafter, the tubing and the tubular support or mandrel may be moved upwardly and the entire apparatus withdrawn from the well.

From the foregoing it will be seen that a relatively simple apparatus is provided which permits setting of the anchoring assembly and packing elements by imposition of tubing weight. Once set, the gripping members are locked in the set position by reason of the engagement of the upper threads 66 on the mandrel with the locking dogs 51. Release of the apparatus is accomplished by a rotation which disengages the support from the locking dogs 51, followed by a raising or lifting of the tubing string to retract the upper expander from behind the gripping members. Thereafter, the lower threads 64 on the tubular support rengage the latching dogs 52, after which a downward force may be applied to the lower expander to withdraw said lower expander from behind the slips. The apparatus thus provides for mechanically setting the anchoring means and packing elements by imposition of the tubing weight and for releasing the anchoring means and packing elements by a positive withdrawal of each of the expander cone members from behind their respective gripping elements.

As shown in the drawings, the locking dogs 51 are formed with left-hand threads while the latching dogs 52 are formed with right-hand threads. Although it has been found that two separate sets of dogs with opposite threads are satisfactory, the two sets of dogs could be combined into a single unitary collar, the bore of which would have right and lefthand threads formed therein in the manner of the criss-cross connection shown in my prior Patent No. 3,083,767. So long as right-hand threads are provided for connection to the support to allow lowering of the support initially and later permitting downward force to be applied to the lower expander and left-hand threads are provided for locking the assembly in set position, the packer can be set and released without any left-hand rotation of the tubing to obviate any possibility of inadvertently backing-off one of the couplings in said tubing string.

The foregoing disclosure and description of the invention is illustrative and explanatory thereof, and various changes in the size, shape and materials, as well as in the details of the illustrated construction, may be made within the scope of the appended claims without departing from the spirit of the invention.

What I claim is:
1. A well packer apparatus comprising:
   a tubular support having connection with a tubing string,
   a friction block unit surrounding the lower portion of the support and having friction blocks for engaging a well pipe within which the apparatus is lowered,
   an anchoring means assembly having connection with said friction block unit, said assembly including an upper expander member, a lower expander member, a slip carrier surrounding said members, and a plurality of gripping slips mounted in said carrier for radial movement,
   a packing element having its lower portion supported upon the upper expander member of the anchoring means assembly,
   a confining abutment above the packing element adapted to be engaged by an external projection on the support when the support is moved downwardly with respect to the packing element and anchoring means assembly,
   means connecting the friction block unit with the lower expander member for holding the same stationary while the support and upper expander are moved downwardly relative thereto.
   a releasable connection connecting the support to the lower expander member when the expander members are in a position permitting the gripping slips to be retracted, whereby such support is utilized to lower the apparatus within the well pipe,
   release of said releasable connection allowing downward movement of the support and upper expander member with respect to the lower expander member whereby the expander members move behind the gripping slips to thereby move the latter radially outwardly into gripping position, said downward movement also moving said external projection on the support into engagement with the confining abutment to apply endwise force to said packing element and deform it into sealing position,
   subsequent upward movement of the support and upper expander member relative to the lower expander member after the gripping slips and packing element have been set releasing the endwise force on the packing element and withdrawing the upper expander member from behind the gripping slips and also functioning to reconnect the releasable connection between the support and lower expander member,
   and means forming part of the releasable connection for transmitting a downward force from the connection to the lower expander member, whereby subsequent downward movement of the support after the upper expander member has been withdrawn will apply a positive downward force to the lower expander member to withdraw it from behind the gripping slips to fully release the anchoring means assembly.

2. A well packer as set forth in claim 1, wherein
   the releasable connection between the support and the lower expander member comprises a threaded section of right-hand threads on the exterior of the support and complementary threads on a latching unit,
   and means for securing said latching unit to said lower expander,
   disengagement of the threads on the support and on the latching unit disconnecting the support from the lower expander member to permit downward movement of the support relative to the lower expander member.

3. A well packer as set forth in claim 1, together with
   means on the support engageable with means connected to the lower expander member for releasably securing the support to said lower expander member after the expander members have moved into position setting the gripping slips in gripping position, whereby said gripping slips are locked in their set position.

4. A well packer as set forth in claim 1, together with
   a threaded section of left-hand threads on the exterior of the support,
   and a locking unit connected with the lower expander and having threads complementary to and engageable with the threads of said threaded section on the support after said support has moved downwardly relative to the lower expander to set the gripping slips and packing element in set position, whereby the same are locked in such said position,
   said threaded connection being releasable by rotation of the support with respect to said locking unit.

5. A well packer as set forth in claim 1, wherein
   the releasable connection between the support and the lower expander member comprises a threaded section of right-hand threads on the exterior of the support, a latching means mounted in the friction block unit and having complementary threads for engagement by said right-hand threads on the exterior of the support,
   disengagement of the threads on the support and on the latching unit disconnecting the support from the lower expander member to permit downward movement of the support relative to the lower expander member,
   a threaded section of left-hand threads on the exterior of the support and spaced from the threaded section of right-hand threads, and
   a locking means mounted in the friction block unit and having threads complementary to and engageable with the left-hand threads on the support after such support has moved downwardly relative to the lower expander to move the gripping slips and packing element in set position whereby the same are locked in such position,
   said left-hand threaded connection being releasable by rotation of the support with respect to said locking means.

6. A well packer apparatus comprising:

a tubular support having connection with a tubing string, a friction unit surrounding the lower portion of the support and having friction means for engaging a well pipe within which the apparatus is lowered, an anchoring means assembly having connection with said friction unit, said assembly including an upper expander member, a lower expander member, a slip carrier surrounding said members, and a plurality of gripping slips mounted in said carrier for radial movement, a packing element having its lower portion supported upon the upper expander of the anchoring means assembly, a confining abutment above the packing element adapted to be engaged by an external projection on the support when the support is moved downwardly with respect to the packing element and anchoring means assembly, means connecting the friction unit with the lower expander member for holding the same stationary while the support and upper expander are moved downwardly relative thereto, a releasable connection connecting the support to the lower expander member when the expander members are in a position permitting the gripping slips to be retracted, whereby such support is utilized to lower the apparatus within the well pipe, release of said releasable connection allowing downward movement of the support and upper expander member with respect to the lower expander member whereby the expander members move behind the gripping slips to thereby move the latter radially outwardly into gripping position, said downward movement also movement said external projection of the support into engagement with the confining abutment to apply endwise force to said packing element and set the same, subsequent upward movement of the support and upper expander member relative to the lower expander member after the gripping slips and packing element have been set releasing the endwise force of the packing element and withdrawing the upper expander member from behind the gripping slips and also functioning to reconnect the releasable connection between the support and the lower expander member, and means forming part of the releasable connection for transmitting a downward force from the connection to the lower expander member, whereby subsequent downward movement of the support after the upper expander member has been withdrawn will apply a positive downward force to the lower expander member to withdraw it from behind the gripping slips to fully release the anchoring means assembly.

7. A well packer apparatus comprising:

a tubular support having connection with a tubing string, a friction unit surrounding the lower portion of the support and having friction means for engaging a well pipe within which the apparatus is lowered, an anchoring means assembly having connection with said friction unit, said assembly including an upper expander member, a lower expander member, a slip carrier surrounding said members, and a plurality of gripping slips mounted in said carrier for radial movement, a packing element having its lower portion supported upon the upper expander of the anchoring means assembly, a confining abutment above the packing element adapted to be engaged by an external projection on the support when the support is moved downwardly with respect to the packing element and anchoring means assembly, means connecting the friction unit with the lower expander member for holding the same stationary while the support and upper expander are moved downwardly relative thereto, a releasable connection connecting the support to the lower expander member when the expander members are in a position permitting the gripping slips to be retracted, whereby such support is utilized to lower the apparatus within the well pipe, release of said releasable connection allowing downward movement of the support and upper expander member with respect to the lower expander member whereby the expander members move behind the gripping slips to thereby move the latter radially outwardly into gripping position, said downward movement also moving said external projection of the support into engagement with the confining abutment to apply endwise force to said packing element and set the same, subsequent upward movement of the support and upper expander member relative to the lower expander member after the gripping slips and packing element have been set releasing the endwise force of the packing element and withdrawing the upper expander member from behind the gripping slips and also functioning to reconnect the releasable connection and the support and the lower expander member, and means on the support engageable with means connected to the lower expander member for releasably securing the support to said lower expander member after the expander members have moved into position setting the gripping slips in gripping position to thereby lock the gripping slips in such set position.

8. An anchoring means assembly for use in a well pipe including:

a support, an upper expander member slideable within limits on the support, a lower expander member slideably mounted on said support, a plurality of gripping elements, means mounting said gripping elements between said upper and lower expanders for limited longitudinal and radial movement with respect thereto, each gripping element comprising a body having its inner surface formed with inclined areas for coaction with the upper and lower expander members, whereby movement of the members relative to the gripping elements controls radial movement of the gripping elements, a friction unit connected with the lower expander member having friction means for frictionally engaging the well pipe within which the assembly is lowered, a threaded section of right-hand threads on the exterior of the support, a latching means mounted in the friction unit and having complementary threads engageable with the right-hand threads on the support, engagement of the right-hand threads on the support and on the latching means forming a connection between said support and the lower expander member and rotation of said support relative to the latching means disconnecting the support from the lower expander member to permit downward movement of the support relative to the lower expander member whereby the expander members move behind the gripping elements to thereby move the gripping elements radially outwardly into gripping position, a threaded section of left-hand threads formed on the exterior of the support, and a locking means mounted in the friction unit and having threads complementary to and engageable with the left-hand threads of said threaded section on the support after the support has moved downwardly relative to the lower expander to set the gripping elements into gripping position, whereby the gripping elements are locked in such gripping position.

9. An anchoring means assembly as set forth in claim 8, wherein
the shape of the inter-engaging right-hand threads on the support and the latching means is such that rotation of the support relative to the latching means is required to move the support downwardly with respect to said means but automatic engagement of the threads is effected upon a straight upward nonrotative movement of the support with respect to said latching means,
the shape of the left-hand threads on the support and on the locking means being such that said threads are engageable by a straight longitudinal movement of the support upwardly with respect to the locking means and are disengageable by a rotative movement of the support relative to said locking means to permit downward movement of the support with respect to said means.

References Cited by the Examiner
UNITED STATES PATENTS

| | | | |
|---|---|---|---|
| 2,383,453 | 8/1945 | Crickmer | 166—216 |
| 2,404,692 | 7/1946 | Church | 166—135 |
| 2,772,740 | 12/1956 | Edwards | 166—129 X |
| 2,851,108 | 9/1958 | Reed | 166—139 |
| 2,893,492 | 7/1959 | Brown | 166—129 X |
| 3,119,450 | 1/1964 | Evans | 166—138 X |

CHARLES E. O'CONNELL, *Primary Examiner.*

D. H. BROWN, *Assistant Examiner.*